Dec. 20, 1949  L. D. TRELOAR  2,492,021
BARBECUE OVEN
Filed Feb. 27, 1947  5 Sheets-Sheet 5
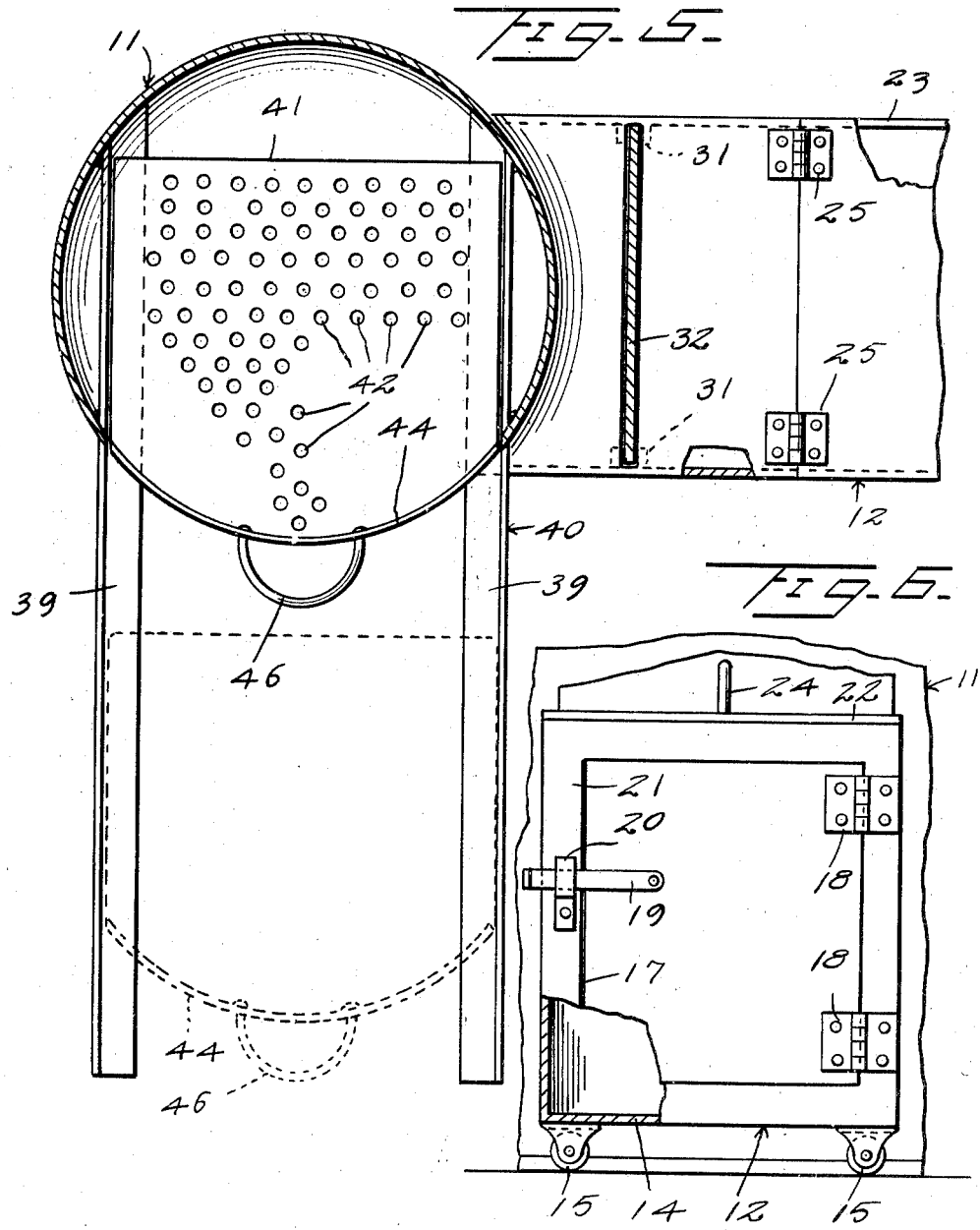
Inventor
L. D. Treloar
By Kimmel & Crowell
Attorneys Patented Dec. 20, 1949

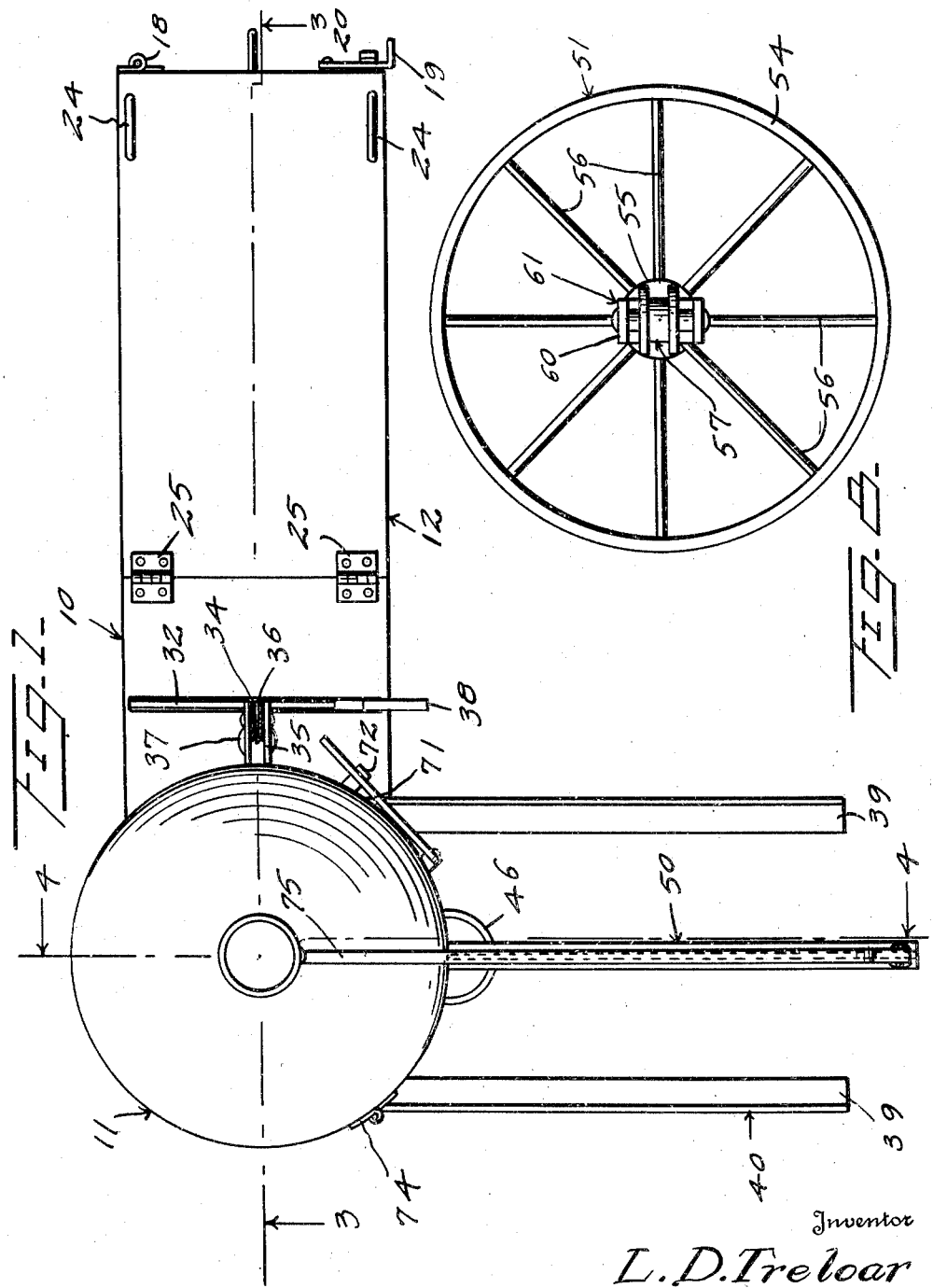

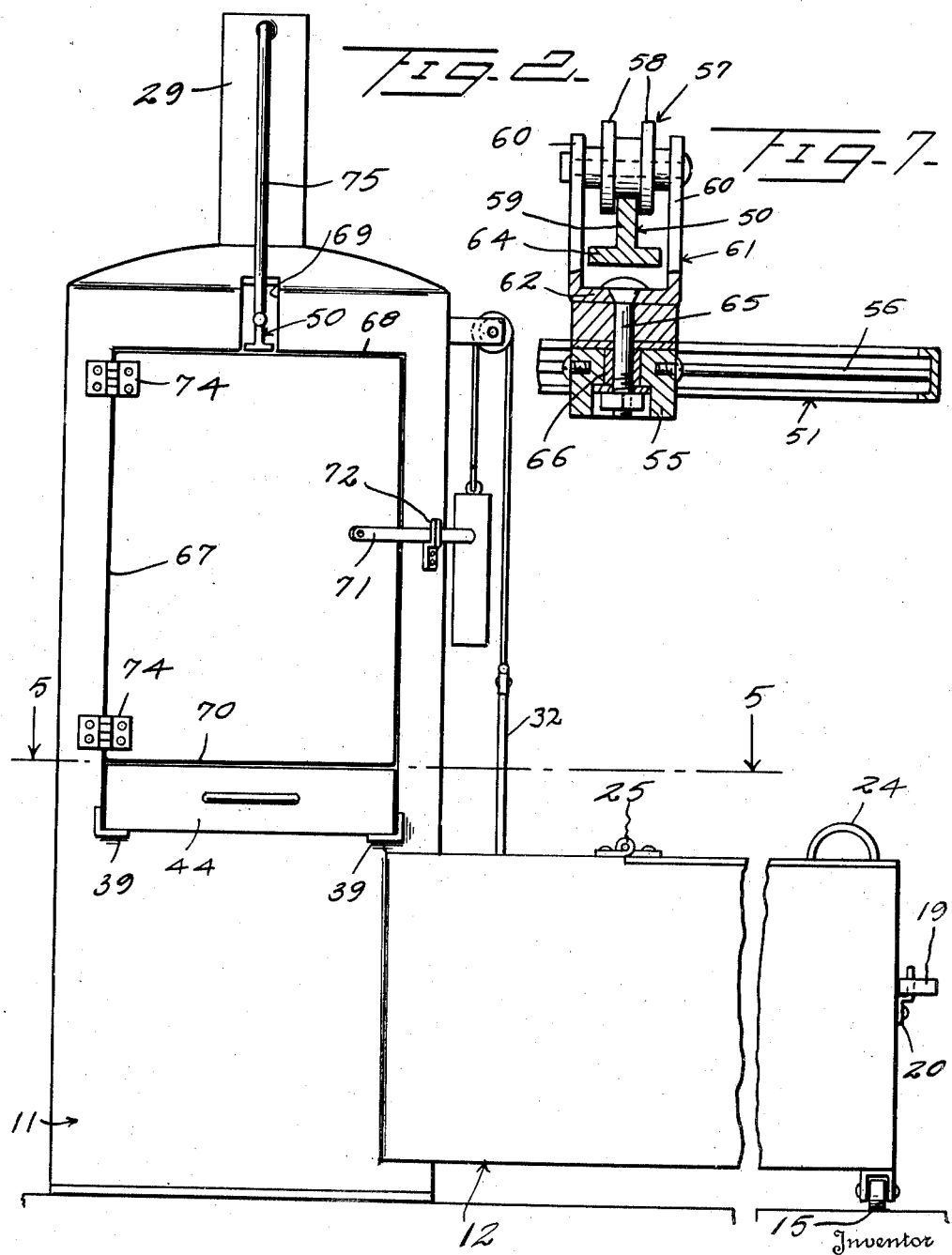

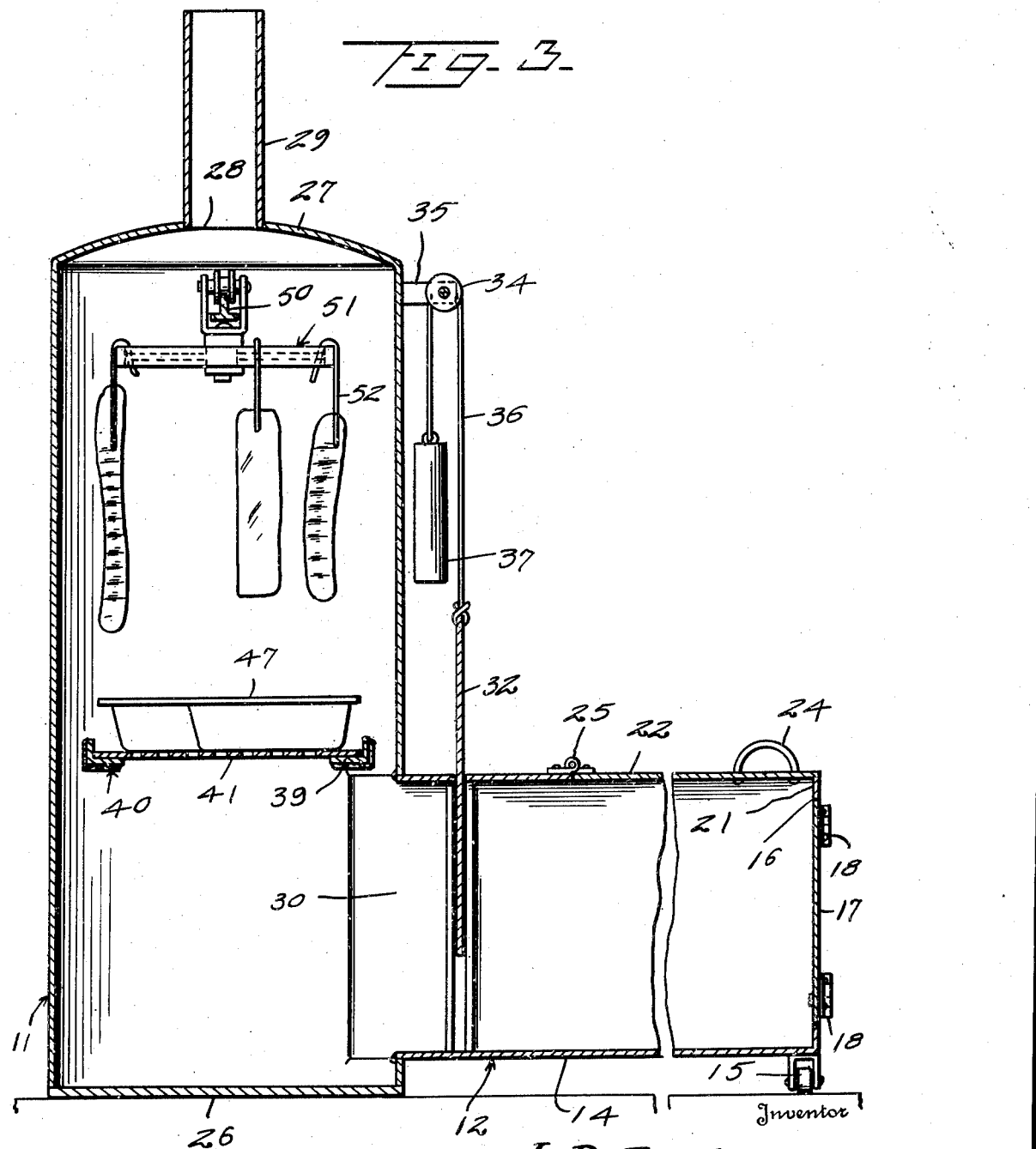

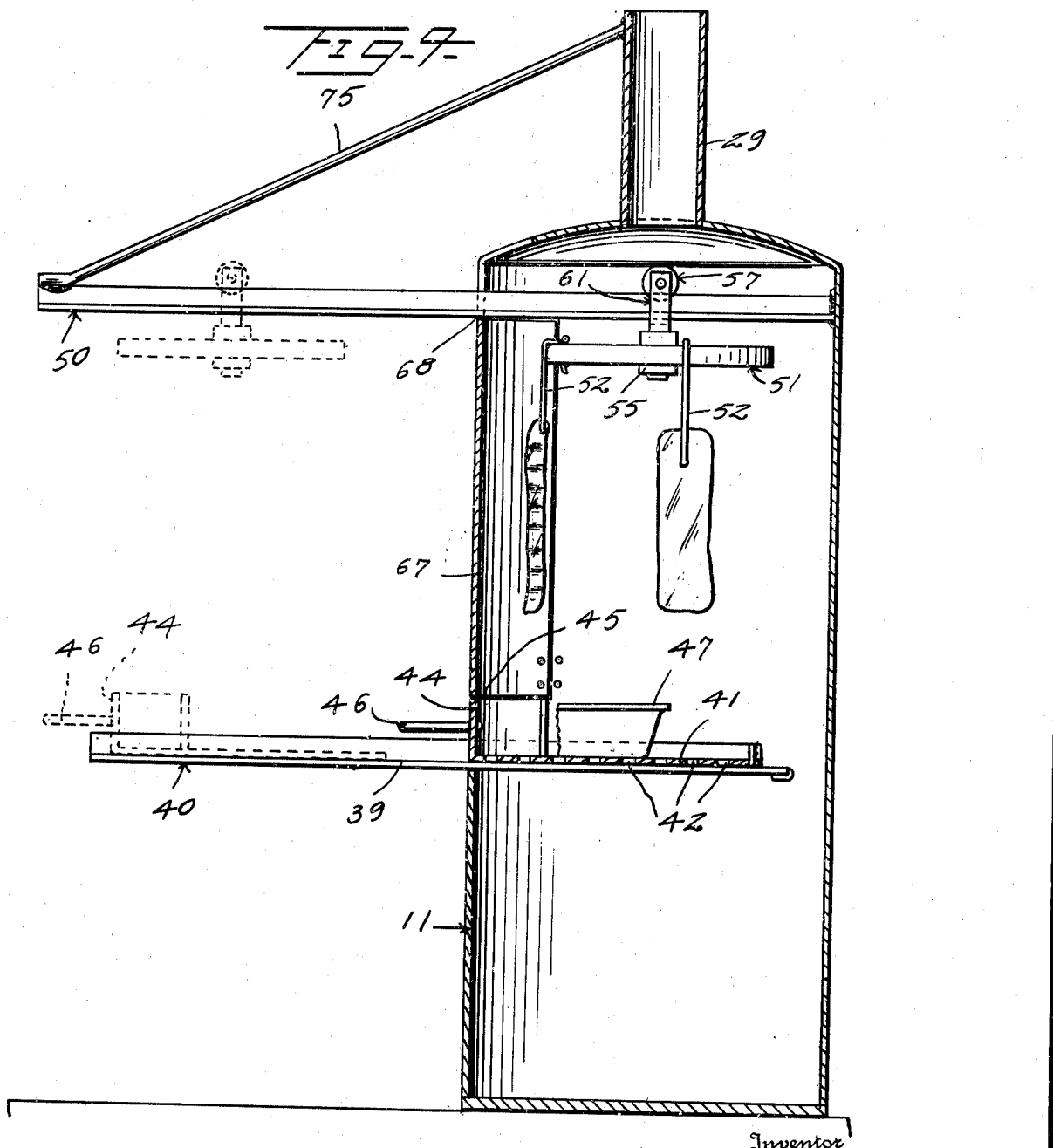

2,492,021

UNITED STATES PATENT OFFICE 2,492,021

BARBECUE OVEN

Lester D. Treloar, Fort Dodge, Iowa

Application February 27, 1947, Serial No. 731,365

4 Claims. (Cl. 99—421)

This invention relates to ovens and more particularly to an improved barbecue oven.

It is an object of this invention to provide an improved oven of the kind to be more specifically described hereinafter, having an oven and a heat or fuel chamber adjacent the oven portion which fuel chamber or firebox is adapted for use with various types of fuels as coal or wood and which is so constructed and arranged that other solid fuel burners as oil or gas may be readily installed in the firebox.

Another object of this invention is to provide an improved oven of this kind having an annular supporting member rotatably mounted on a trolley and track for sliding into and out of the oven, whereby the ribs or other foods which may be suspended from the supporting member may be readily attached or removed from the support by sliding the support from the oven.

Still another object of this invention is to provide an improved oven of this kind having a drawer or tray in the lower portion thereof for supporting beans or other smaller articles in the oven, and a track for the drawer, whereby the drawer may be readily removed from the oven by sliding on the tracks fixed to the oven, thus providing for the easy handling of the heavy drawer when loaded with foods.

Yet another object of this invention is to provide an oven of this kind having an elongated firebox on one side thereof into which the fuel may be inserted through an opening in the top or in the end thereof, the end opening providing also an accessible opening for removing the ashes and a draft for the oven.

A further object of this invention is to provide an improved oven of this kind having an elongated firebox on one side thereof, and a counterbalanced draft door between the oven and firebox whereby the vertically sliding draft door may be supported at any position between the extreme open or closed positions without the necessity of latches or locks on the draft door and which provides for the ready moving of the door by an operator from one selected position to another.

With the above and other objects in view, my invention consists in the arrangement, combination and details of construction disclosed in the drawings and specification, and then more particularly pointed out in the appended claims.

In the drawings,

Figure 1 is a top plan view of a barbecue oven constructed according to an embodiment of this invention, Figure 2 is a side elevation, partly broken away, Figure 3 is a vertical section taken on the line 3—3 of Figure 1, Figure 4 is a vertical section taken on the line 4—4 of Figure 1.

Figure 5 is a transverse section taken on the line 5—5 of Figure 2,

Figure 6 is a fragmentary end elevation, partly broken away and partly in section, Figure 7 is a fragmentary detail section of the connection between the supporting rack and the upper track, Figure 8 is a top plan view of the upper support removed from the track and oven.

Referring to the drawings, the numeral 10 designates generally a barbecue oven having a cooking or heating chamber 11 and a firebox 12 adjacent the lower end of the heating chamber 11 and communicating therewith. The firebox 12 is formed of a substantially rectangular chamber or receptacle having the bottom 14 thereof spaced upwardly from the ground or supporting base for the oven.

Rollers 15 are mounted on the outer end of the firebox 12 for supporting this end of the firebox. The firebox 12 is formed with an opening 16 at the outer end thereof and a closure 17 is hingedly supported by hinges 18 for closing the opening 16. A latch 19 is pivotally mounted on the closure 17, engaging in a hasp 20 fixed on the inwardly extending flange 21 on the free end of the firebox 12.

The firebox is further formed with an elongated opening 23 on the top thereof, extending a large portion of the length of the firebox 12, and a closure 22, having a handle 24, is hingedly mounted by hinges 25 for closing the opening 23. The fuel, such as coal or wood may be admitted to the firebox 12 through either of the openings 23 or 16, and the closure 17 provides a draft door for the oven when such fuel is used. With such a construction and such access to the firebox, other forms of heat supplying devices such as an oil or a gas burner may readily be installed with very little changes or modification to the firebox.

The cooking chamber 11 is formed of a substantially cylindrical body closed at its lower end by the bottom 26, having a dome-shaped upper end 27 with a central opening 28 from which the flue 29 extends vertically upward. The cooking or heating chamber 11 is provided with a large opening 30 near the bottom thereof, communicating with the firebox 12. A pair of horizontally spaced apart supporting members or guides 31 are fixed vertically to the side walls of the firebox 12, adjacent the opening 30 in the heating chamber 11 on both sides of the box, to form a guide or track for the vertically slidable plate 32 therein.

The plate 32 forms a closure or draft door between the firebox 12 and the cooking or heating chamber 11 and is adapted in its fullest closed position to completely close the opening 30. A pulley 34 is rotatably supported on a bracket 35 near the upper end of the heating chamber 11 and a cord or other flexible member 36 is fixed at one end to the upper edge of the draft door 32, is trained over the pulley and connected at its other end to a counterbalance 37. A handle 38 is fixed on the upper edge of the draft door 32 so that it may be raised or lowered to a desired position and will remain there in this selected position balanced by the counterweight 37.

A pair of L-shaped rails having the lower horizontal arms thereof extending inwardly are fixed at one end in the heating chamber 11 to the walls thereof. The rails 39 extend outwardly from their connection within the heating chamber 11 to form a track 40. A perforated drawer 41, having openings 42 therethrough, is adapted to be supported on the rails 39 within the heating chamber 11, and is formed with an arcuate upwardly extending flange 44 on the outer end thereof which is adapted to close the opening 45 in the wall of the chamber 11 above the track 40 to form a continuation of the wall.

A handle 46 is fixed to the flange 44, extending outwardly therefrom so that the drawer 41 may be slid outwardly on the track 40 to the dotted line position shown in Figure 4. The drawer 41 is provided for supporting in the heating chamber 11 pans as 47, or other suitable containers for holding small articles within the oven.

An inverted T-shaped rail 50 is fixed in the heating chamber 11 at the upper end thereof, extending diametrically thereacross. The rail 50 extends outwardly from the heating chamber 11 in the same manner as the track 40 described above. An annular rack 51 is adapted to be slidably and rotatably carried on the track 50 for supporting articles in the oven which may be hung from the rack.

In the use of such ovens, ribs of beef, etc., are adapted to be hung from the rack 51 by hooks 52 engaging the food at one end and engageable with the rack 51 at the other end. The rack 51 is formed as a wheel, having a periphery 54 supported about a hub 55 by radially extending spokes 56. The rack 51 is adapted to be supported from the track 50 by a roller 57 having a pair of flanges 58 engageable on opposite sides of the vertical web 59 of the rail 50. The roller 57 is rotatably supported between the free ends of the arms 60 of an inverted U-shaped bracket 61. The bight 62 of the bracket 61 is adapted to underlie the flange 64 of the rail 50, having the arms 60 extending upwardly on opposite sides of the rail 50.

A pin 65 engages through the center of the bight 62 and through the bearing 66 in the center of the hub 55 of the rack 51. A large door 67 is provided in the heating chamber 11 below the track 50 for closing the opening 68 through which the rack 51 may be moved on the track 50. A rectangular opening 69 is formed in the wall of the heating chamber 11 at the upper end thereof to permit the passage of the roller 57 and bracket 61.

The lower edge 70 of the door 67 is disposed adjacent the upper edge of the drawer 44, so that when the door 67 is opened and the drawer 44 is pulled out, a single opening is formed in the heating chamber by the openings 45 and 68. The door 67 is adapted to be latched in its closed position by a lever 71 pivotally mounted thereon, engaging in a hasp 72 fixed to the chamber 11 adjacent the free end of the door 67 opposite from the supporting hinges 74.

For supporting the outer free end of the track 50, a supporting rod or bar 75 is fixed at one end to the outer end of the rail 50, and at the other end to the flue 29. The tracks on the heating chamber 11 in this manner provide for the ready attachment of heavier foods to the racks and in the drawer outside of the oven. As it is often desired to either add more foods onto the racks or to remove some of the food from the racks while the oven is very hot, it is provided by such a construction for sliding the entire rack from the oven where the foods may be readily added to or removed from the rack.

I do not mean to confine myself to the exact details of construction herein disclosed, but claim all variations falling within the purview of the appended claims.

What I claim is:

1. An improved oven comprising a cooking chamber, a firebox adjacent said cooking chamber and communicating therewith, a perforated drawer in said cooking chamber, a track in said oven and extending therefrom, slidably supporting said drawer thereon, a second track in said oven and extending therefrom, and a food supporting member slidably and rotatably mounted on said second track and a slidable closure between said cooking chamber and said firebox.

2. An improved oven comprising a cooking chamber, a firebox adjacent said cooking chamber and communicating therewith, a perforated drawer in said cooking chamber, a track in said oven and extending therefrom, slidably supporting said drawer thereon, a second track in said oven and extending therefrom, a food supporting member slidably and rotatably mounted on said second track, a slidable closure between said cooking chamber and said firebox, and a counterweight for said closure.

3. A barbecue oven comprising a cooking chamber, a firebox communicating with said cooking chamber, a track in said cooking chamber extending outwardly therefrom, a food supporting rack, a U-shaped bracket, a roller carried by said bracket engaging said track and means rotatably securing said rack on said bracket.

4. An improved oven comprising a cooking chamber, a firebox adjacent said cooking chamber and communicating therewith, a lower track in said oven and extending therefrom, an article supporting member slidable on said track, an upper track in said oven above said lower track and extending therefrom, a food supporting member slidable and rotatable on said upper track, a movable closure between said cooking chamber and means for securing said closure in a selected position.

LESTER D. TRELOAR.

REFERENCES CITED

The following references are of record in the file of this patent:

UNITED STATES PATENTS

| Number | Name | Date |
| --- | --- | --- |
| 796,593 | Mohan | Aug. 8, 1905 |
| 838,826 | Walls | Dec. 18, 1906 |
| 967,447 | Schmidt | Aug. 16, 1910 |
| 1,275,959 | Martin | Aug. 13, 1918 |
| 1,516,728 | Hiu | Nov. 25, 1924 |
| 1,596,333 | Boyle | Aug. 17, 1926 |
| 1,618,905 | Baentach | Feb. 22, 1927 |
| 2,156,860 | Lucas | May 2, 1939 |
| 2,306,519 | Bobo | Dec. 29, 1942 |
| 2,314,627 | Millikan | Mar. 23, 1943 |
| 2,470,878 | Tate | May 24, 1949 |